United States Patent [19]
Rockwell

[11] Patent Number: 6,099,130
[45] Date of Patent: Aug. 8, 2000

[54] LIGHT BOX APPARATUS FOR COMPUTER EDITING OF PHOTOGRAPHS

[76] Inventor: Ronald G. Rockwell, RD7, Box 7725, Stroudsburg, Pa. 18360

[21] Appl. No.: 08/633,900

[22] Filed: Apr. 17, 1996

[51] Int. Cl.$^7$ .................................................. G03B 21/00
[52] U.S. Cl. ............................... 353/120; 353/28; 40/367
[58] Field of Search .................................... 353/120, 119, 353/28, 97, 104, DIG. 5; 362/97, 98, 365, 366; 40/361, 367; 356/391, 392, 393

[56] References Cited

U.S. PATENT DOCUMENTS

| | | | |
|---|---|---|---|
| 3,626,617 | 12/1971 | Frey | 40/367 |
| 4,390,257 | 6/1983 | Fernekes et al. | 353/104 |
| 5,052,797 | 10/1991 | Madsen | 353/28 |
| 5,122,941 | 6/1992 | Gross | 362/98 |

Primary Examiner—William Dowling

[57] ABSTRACT

An improved light box and film matrix with magnified viewing means for editing photographic images that have been scanned into a computer for photo manipulation. The light box contains light-blocking shades on top, left and right sides, and may be attached to the side of a computer monitor or placed on a horizontal surface. The film matrix confines photographic film while blocking extraneous light coming from within or behind the light box translucent viewing surface, and may be rotated 900 to accommodate horizontal or vertical images. The matrix holds mounted 35 mm and 6×6 cm slides, and single frames or sheets of 35 mm, 6×6 cm, 6×7 cm, and 9.8×12.4 cm film. A unique mounting bracket allows the light box to be placed vertically, immediately adjacent to the computer screen while comparing images, eliminating eye and back strain associated with conventional horizontally placed light boxes. The bracket can be repositioned on the light box to allow angled placement on a horizontal surface with an adjustable viewing angle. A magnification device is temporarily attached or detached to inspect the photographic image at greater magnification, so that details and color in the photo may be compared to the digital image on the computer.

2 Claims, 16 Drawing Sheets

Exploded View of Light Box on Computer Monitor

Figure 1: Light Box on Computer Monitor
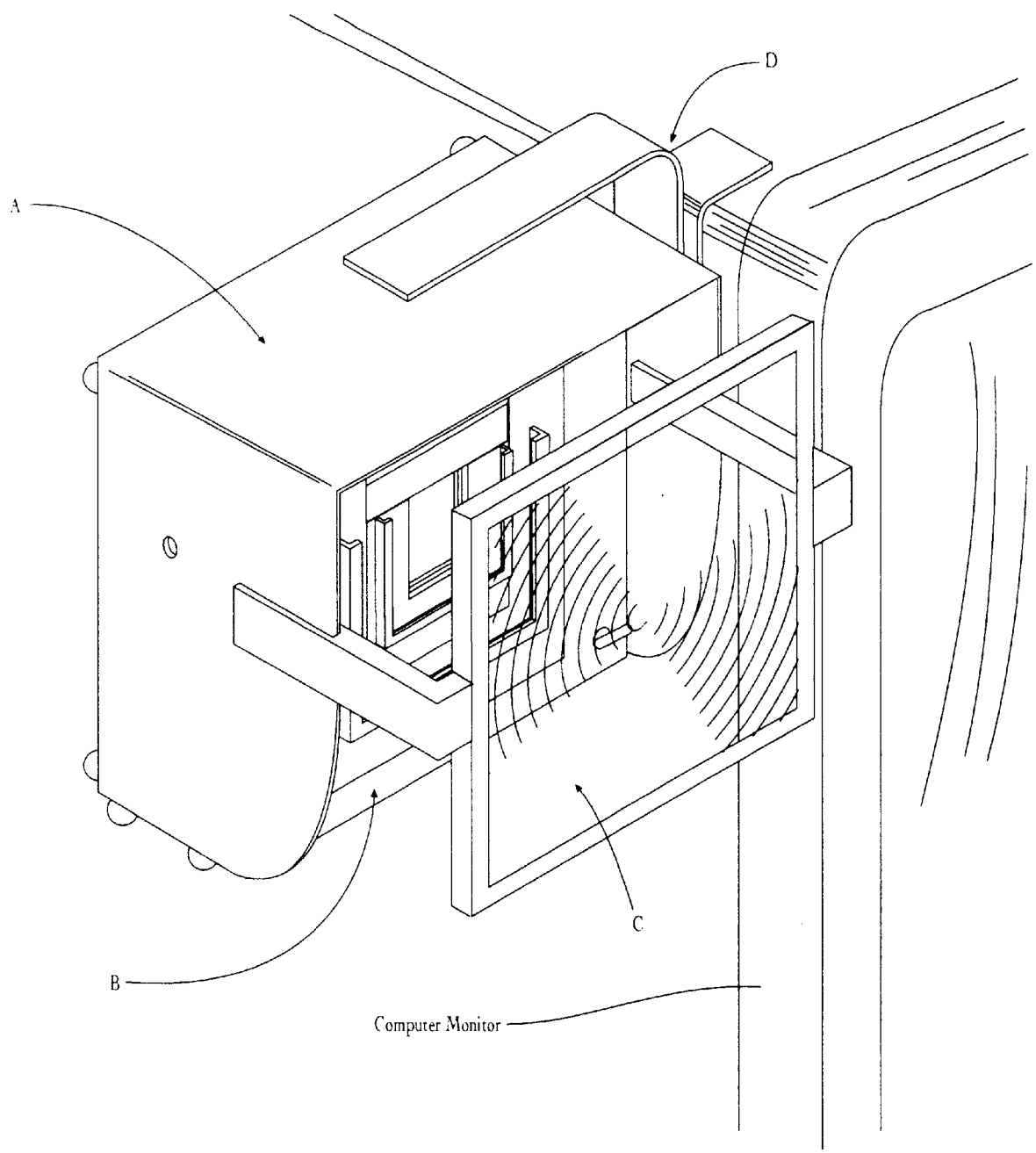

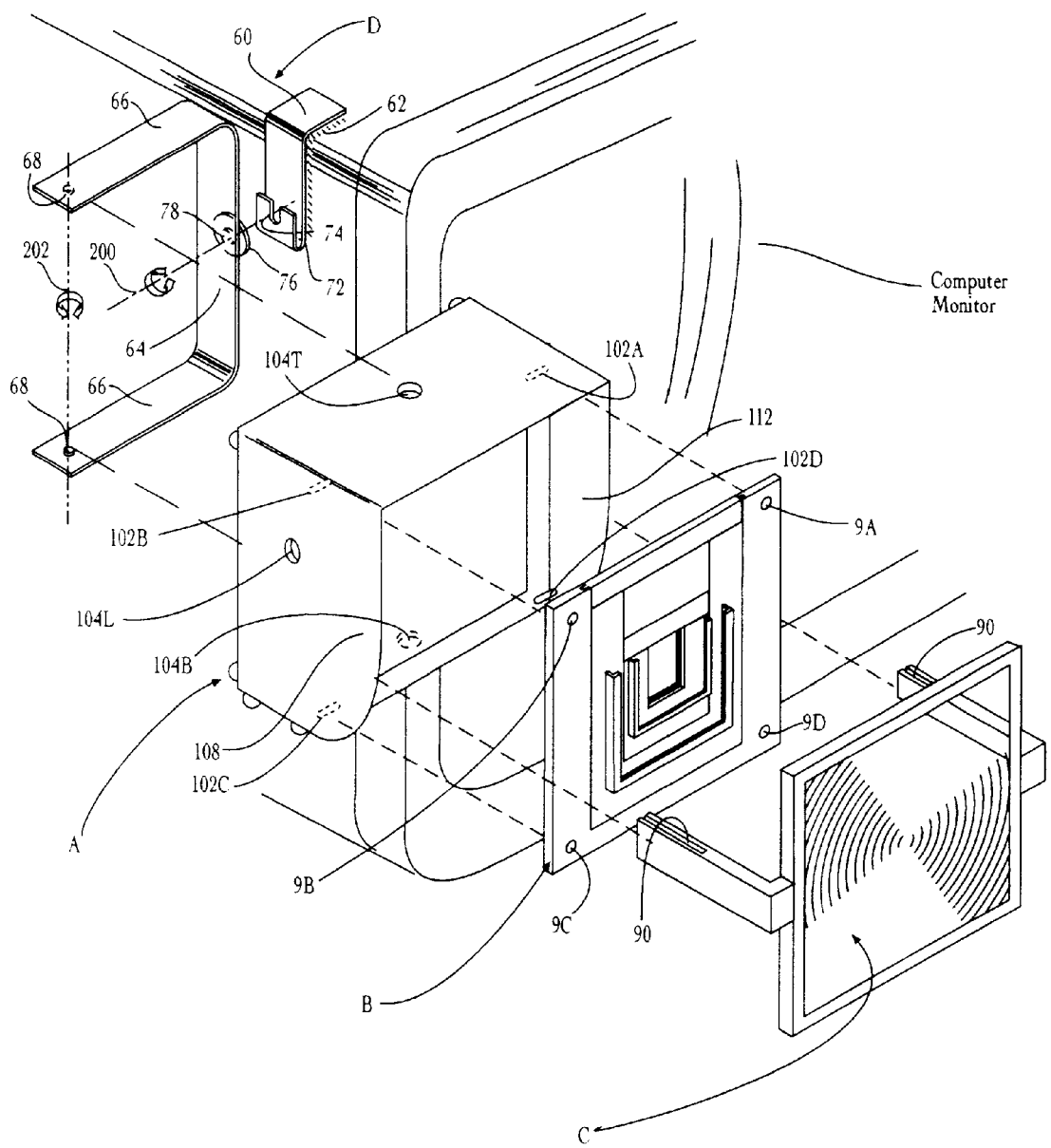
Figure 1A: Exploded View of Light Box on Computer Monitor

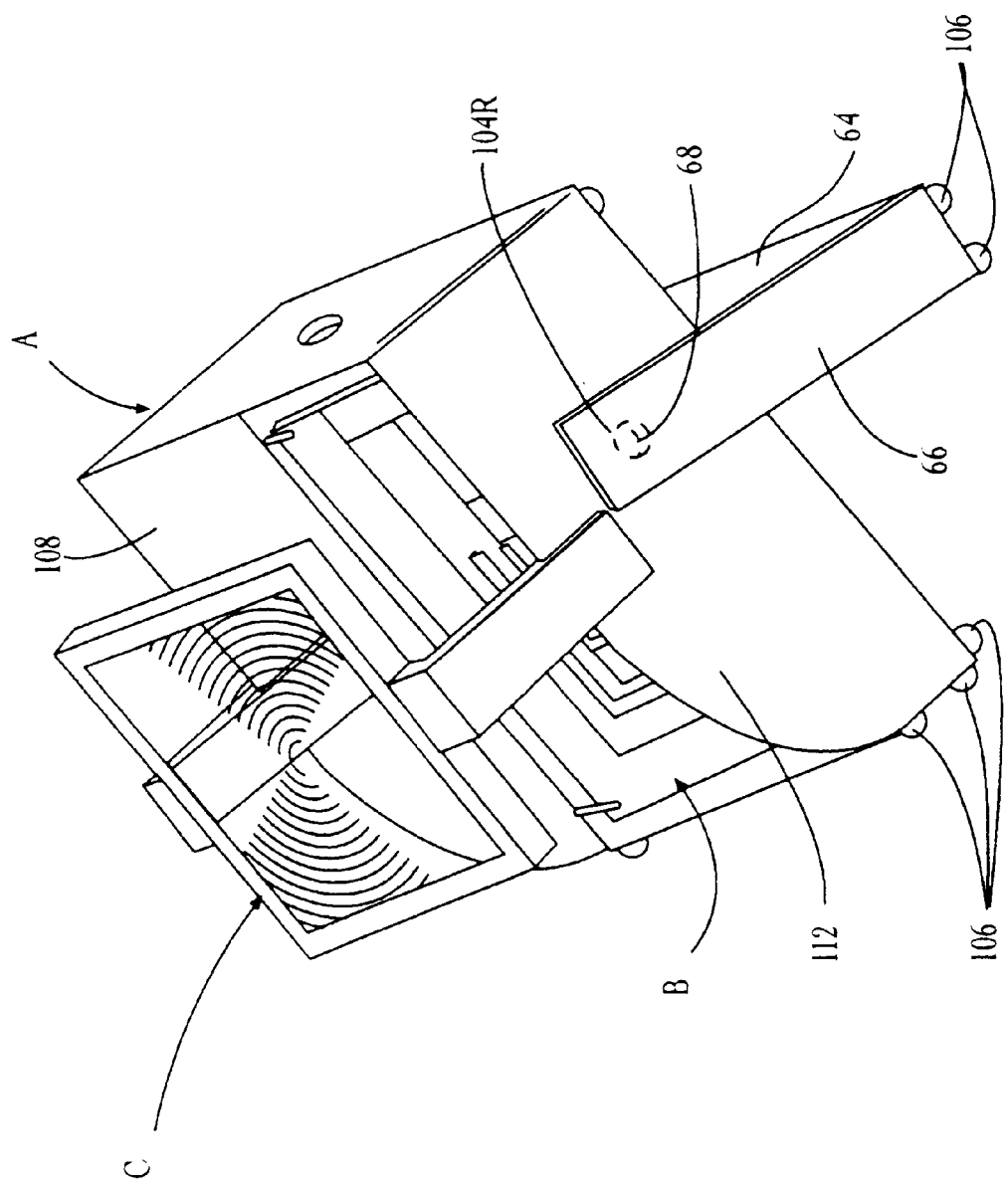
Figure 2: Light Box on Desktop or Horizontal Surface

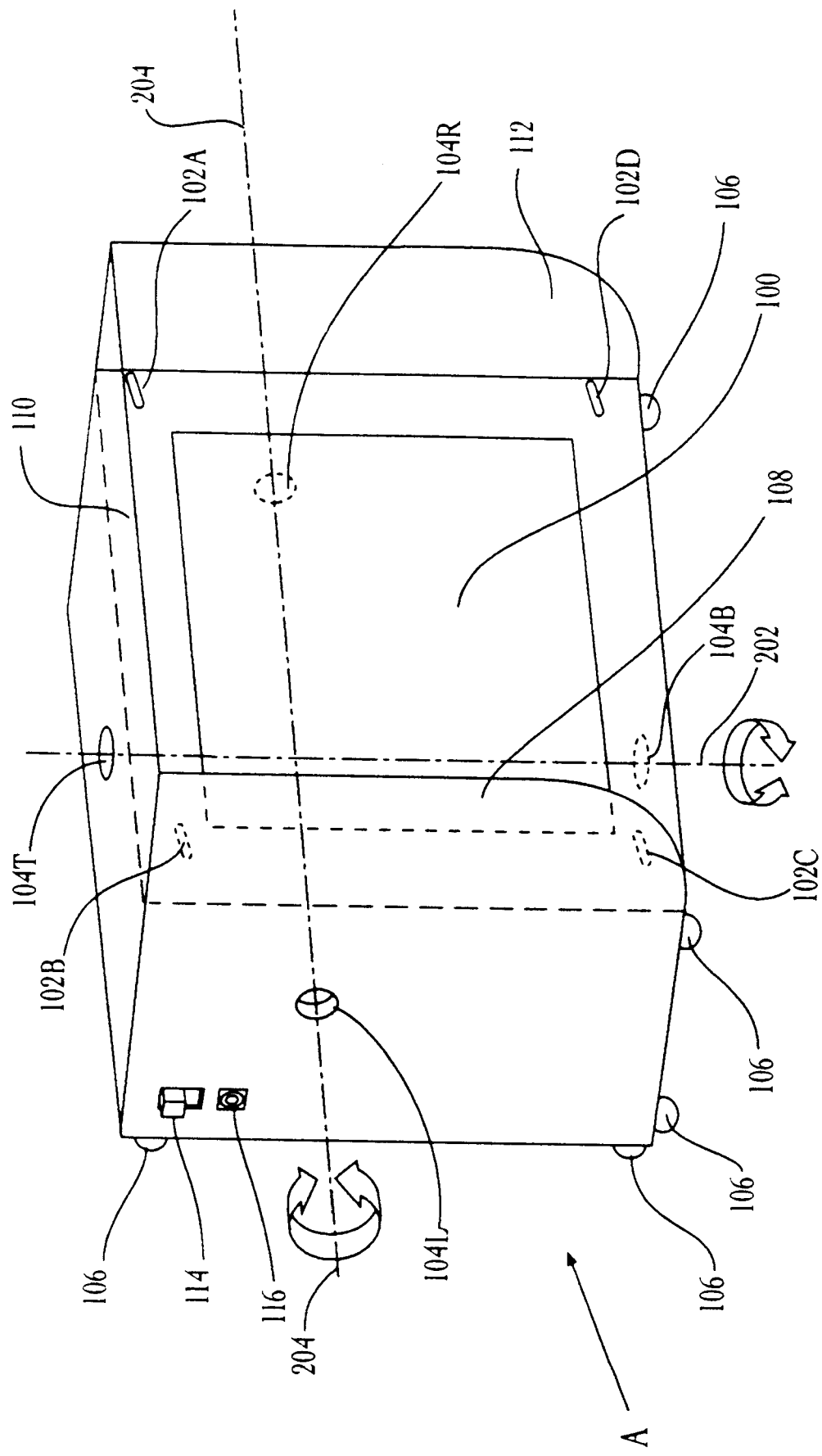
Figure 3: Light Box Details

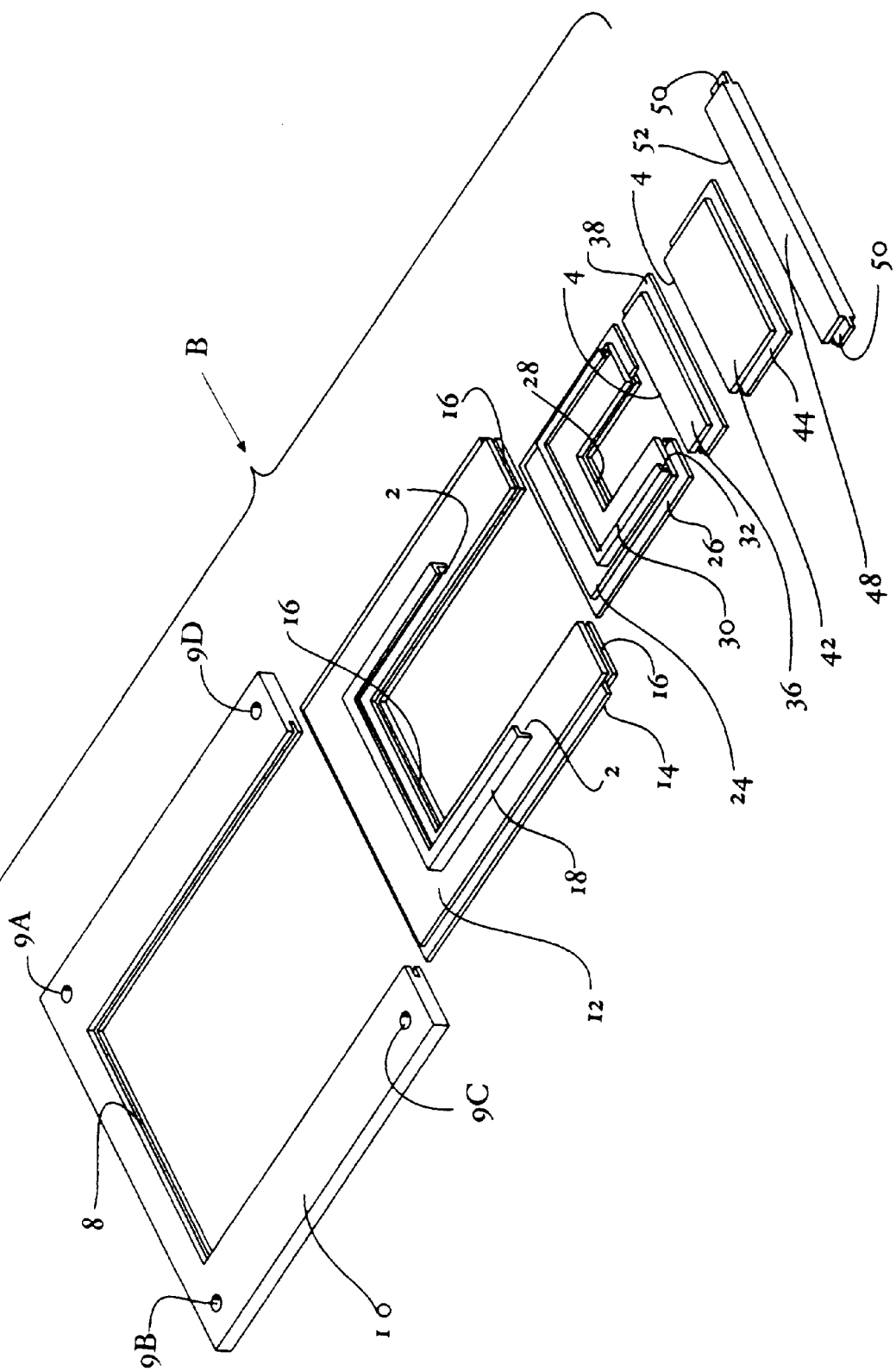

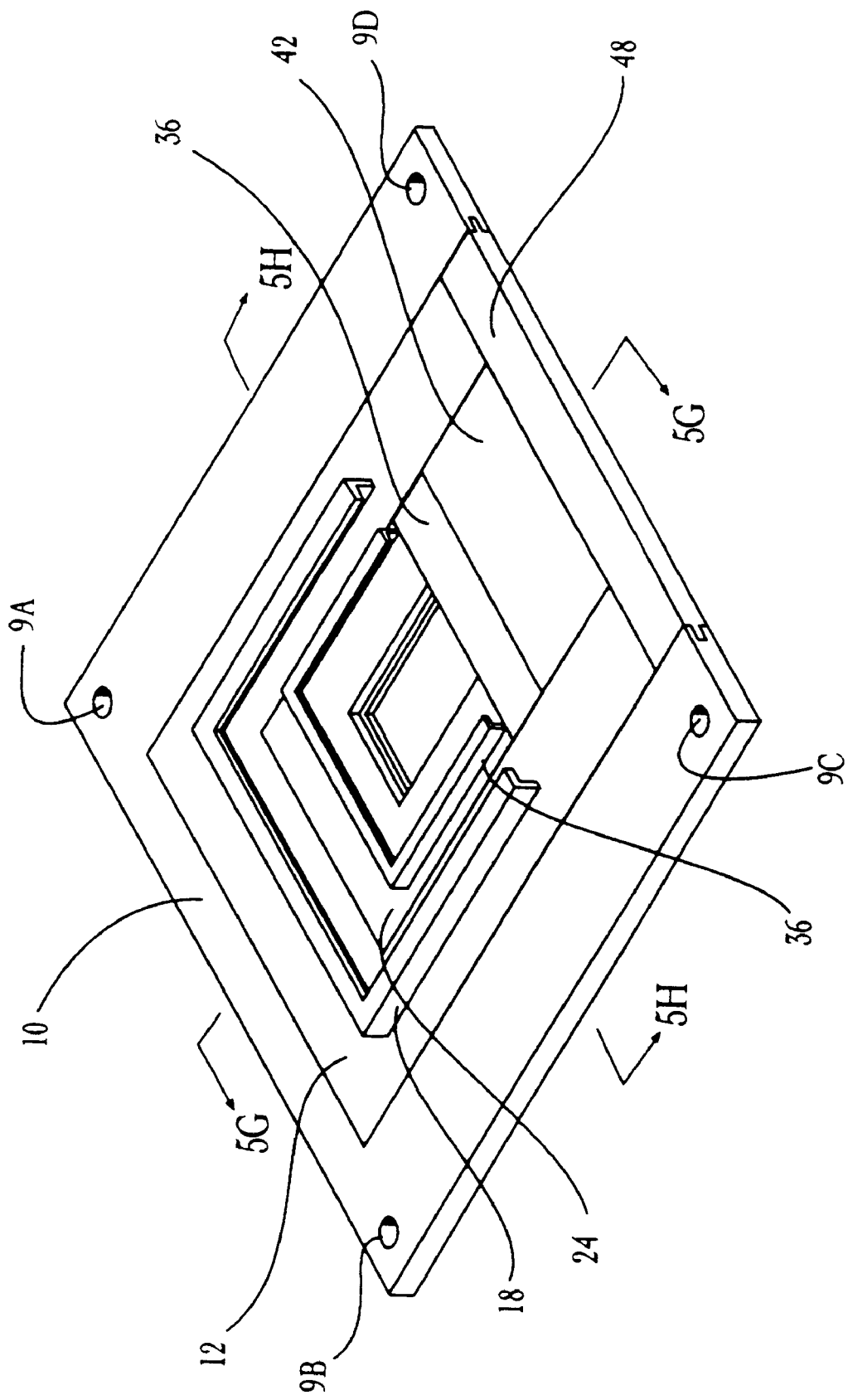
Figure 5: Assembled Film Matrix

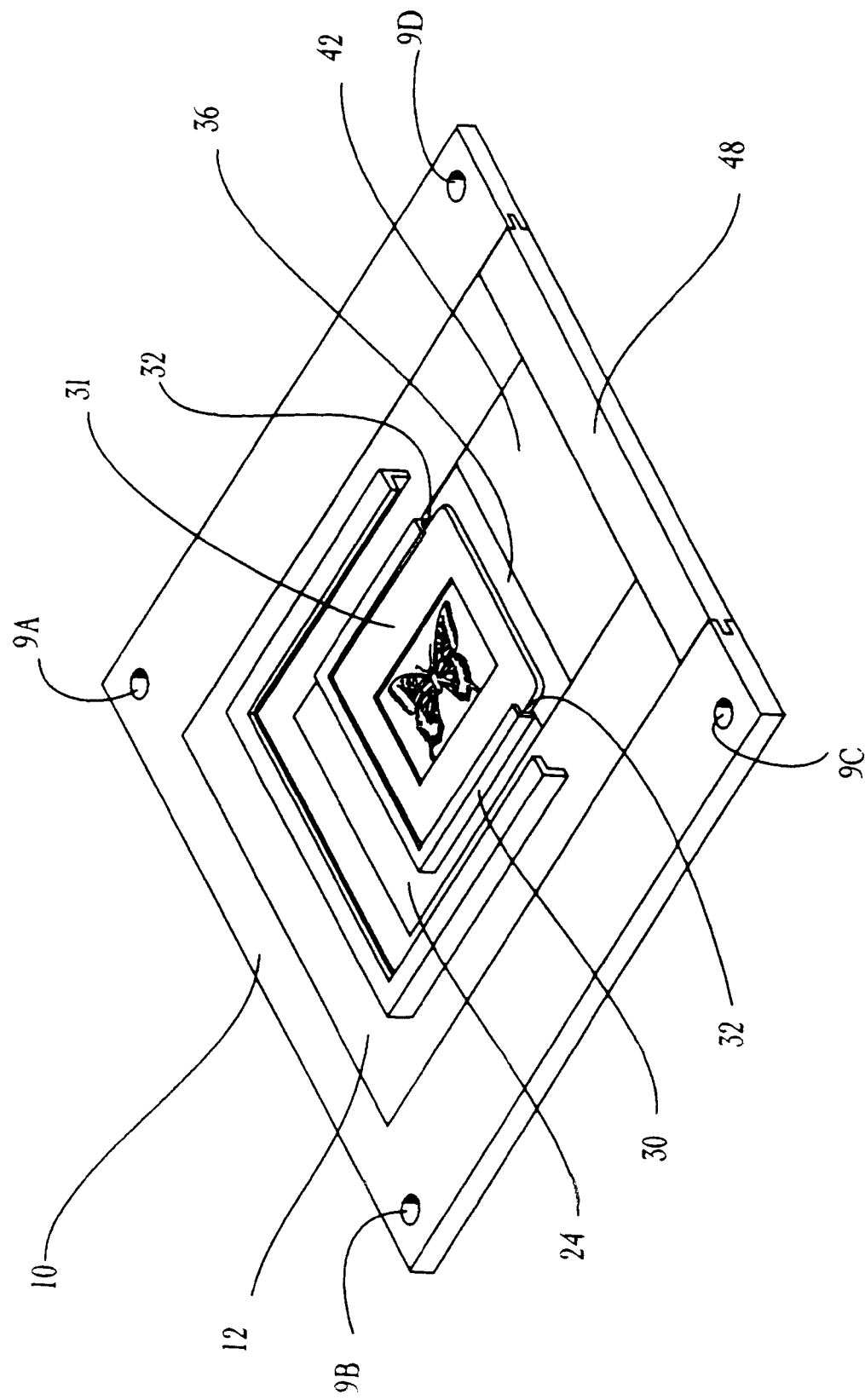
Figure 5A: Assembled Film Matrix for Mounted 35mm Slide

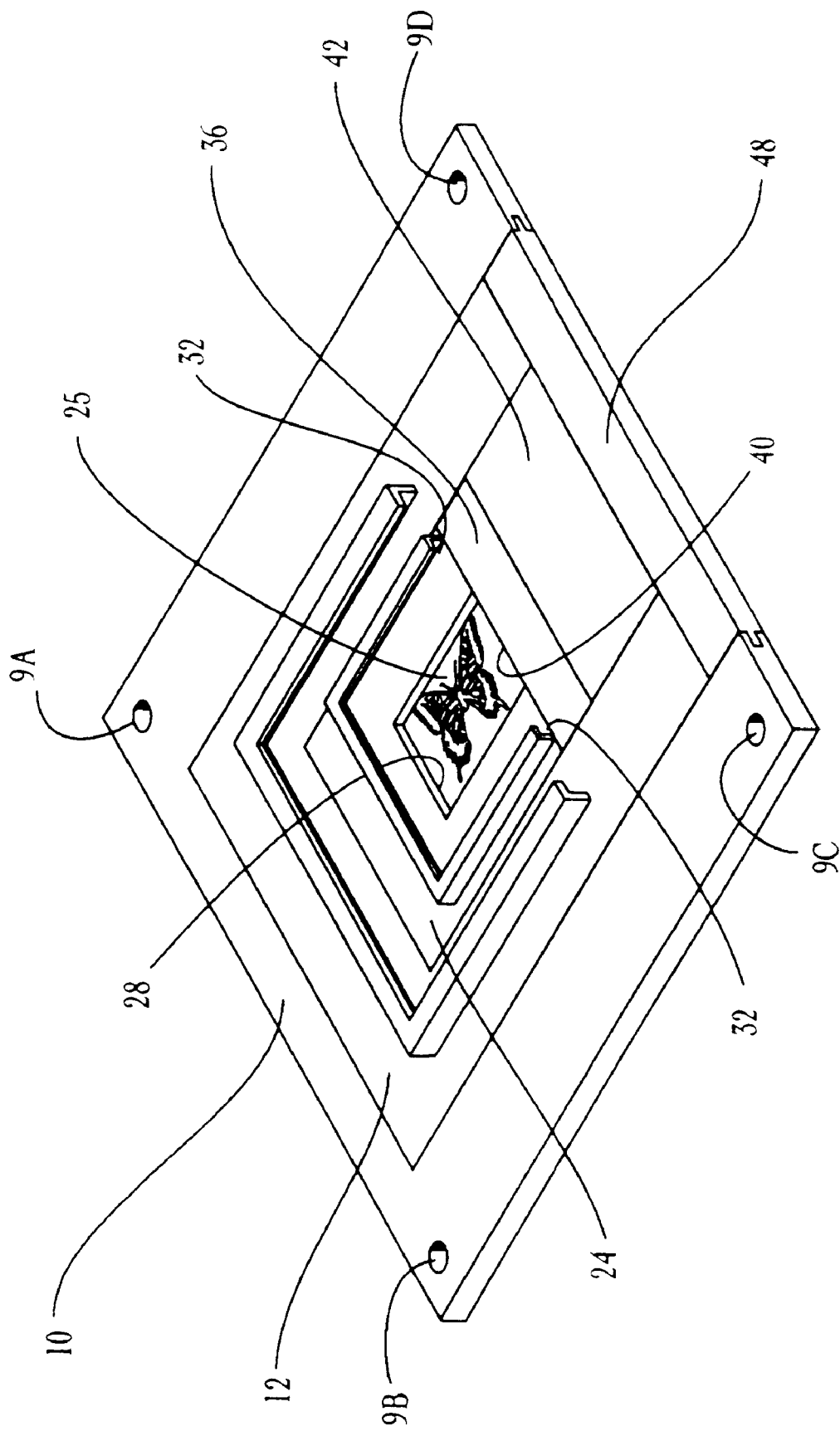
Figure 5B: Assembled Film Matrix for 35mm Film

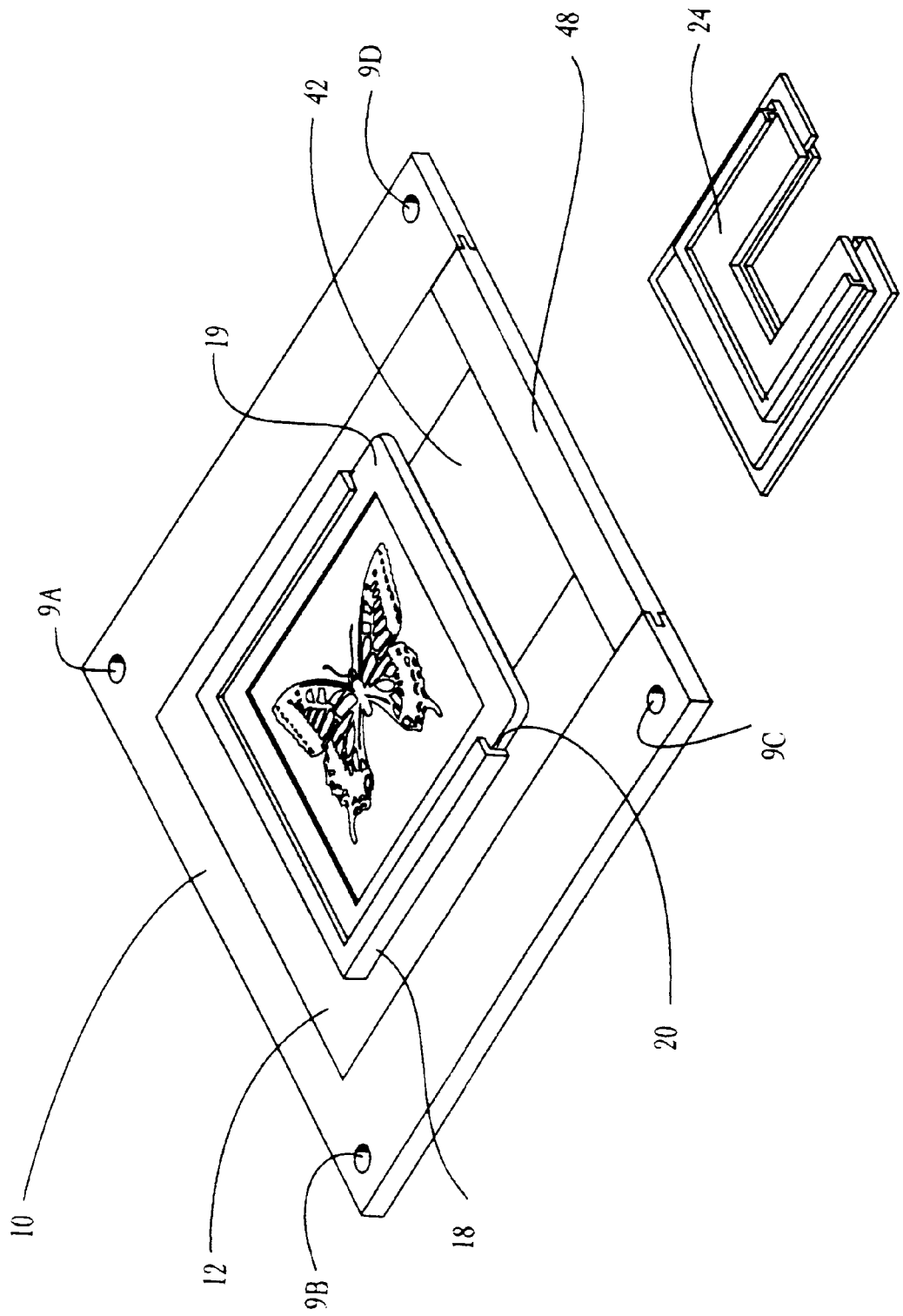
Figure 5C: Assembled Film Matrix for Mounted 6x9Cm Slide

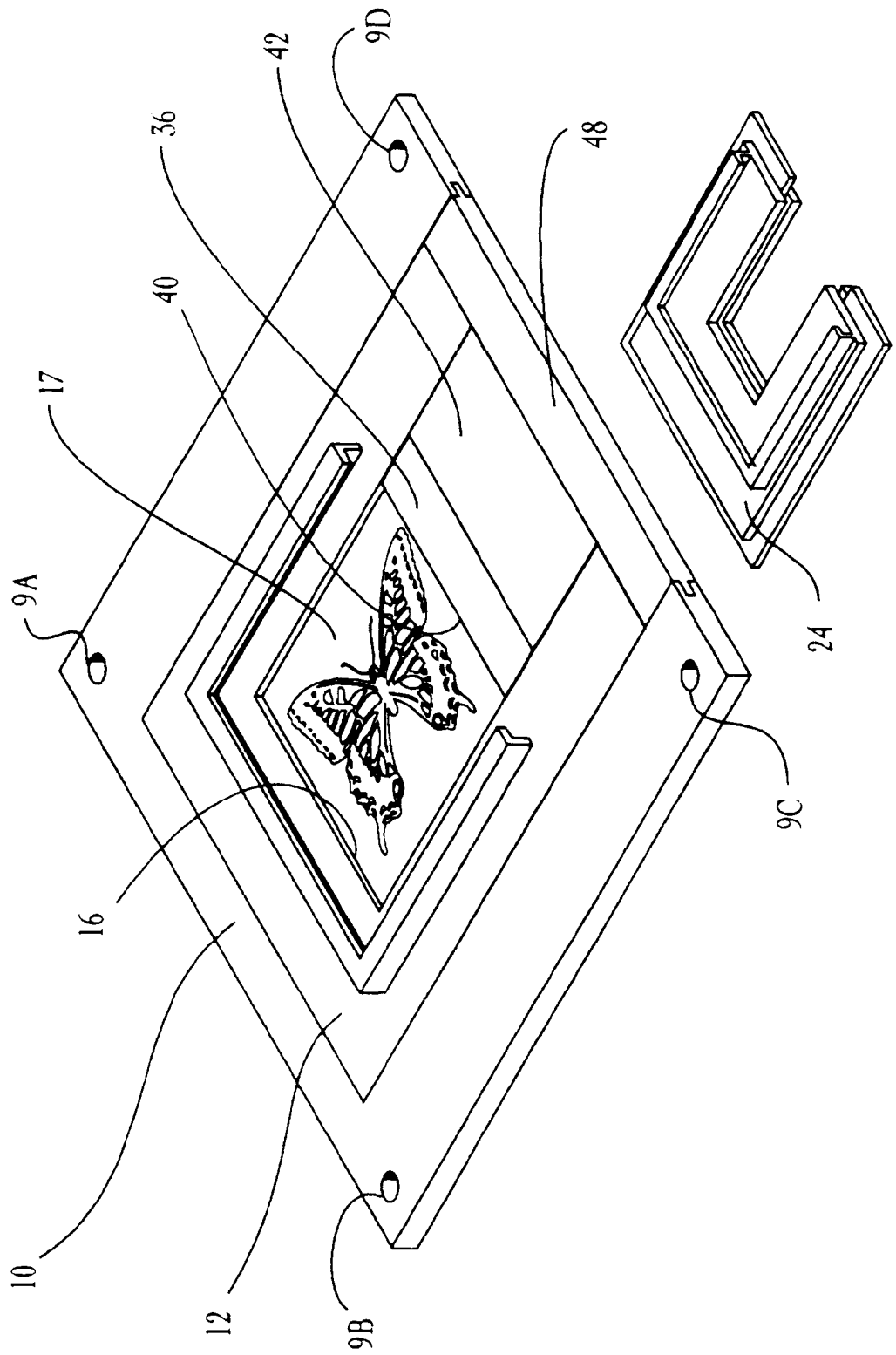
Figure 5D: Assembled Film Matrix for 6x9Cm Film

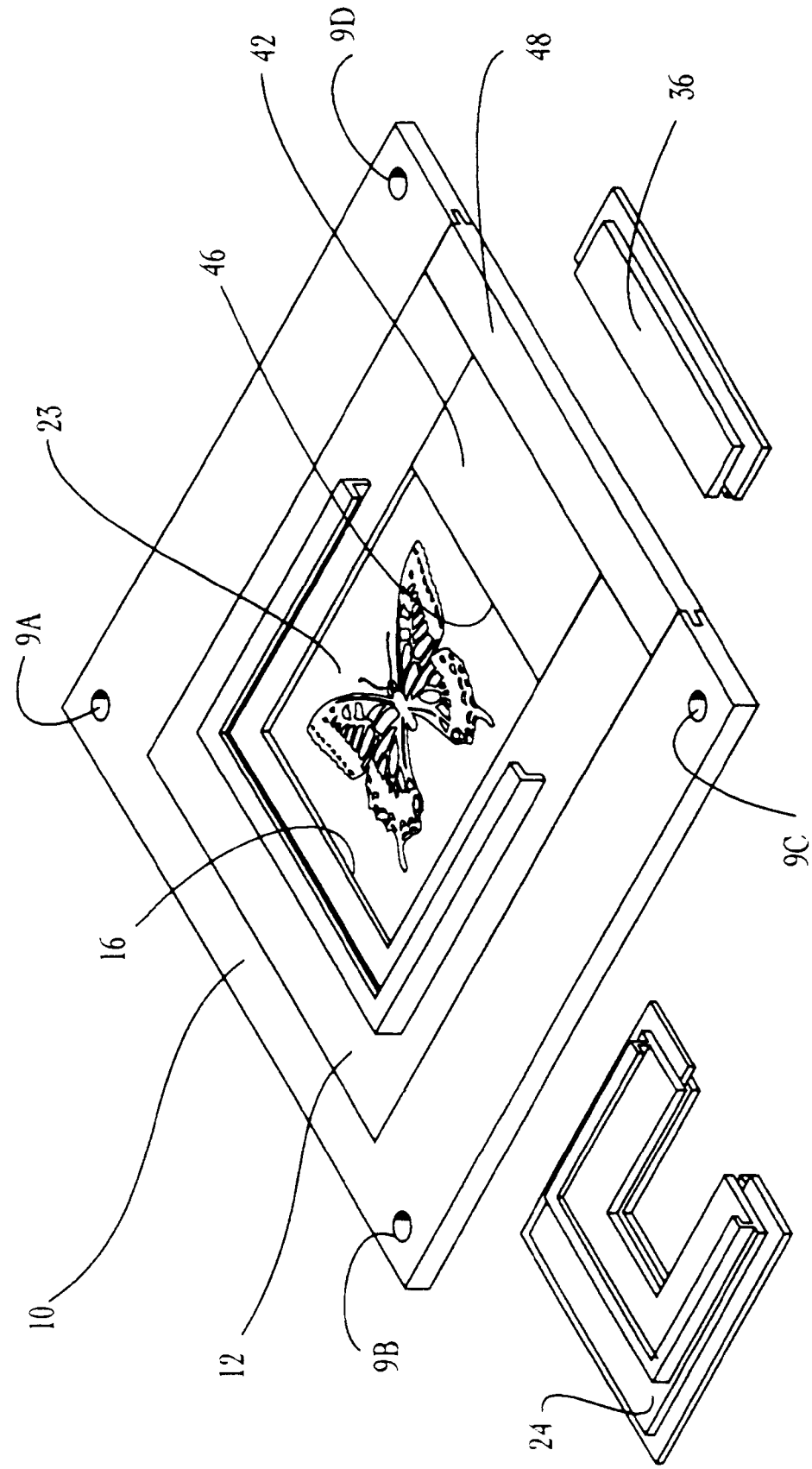
Figure 5E: Assembled Film Matrix for 6x7 cm Film

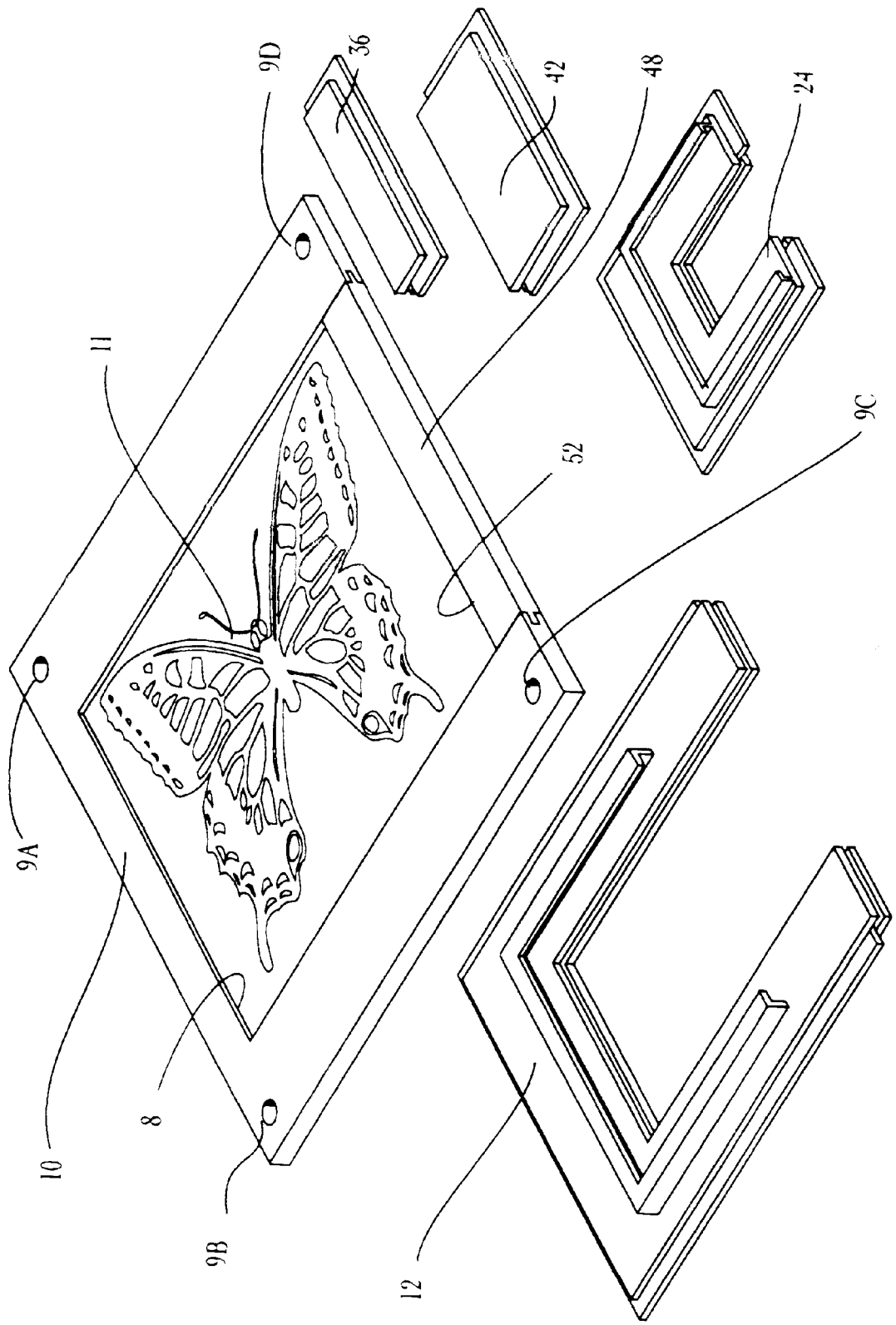
Figure 5F: Assembled Film Matrix for 9.8x12.4cm Film

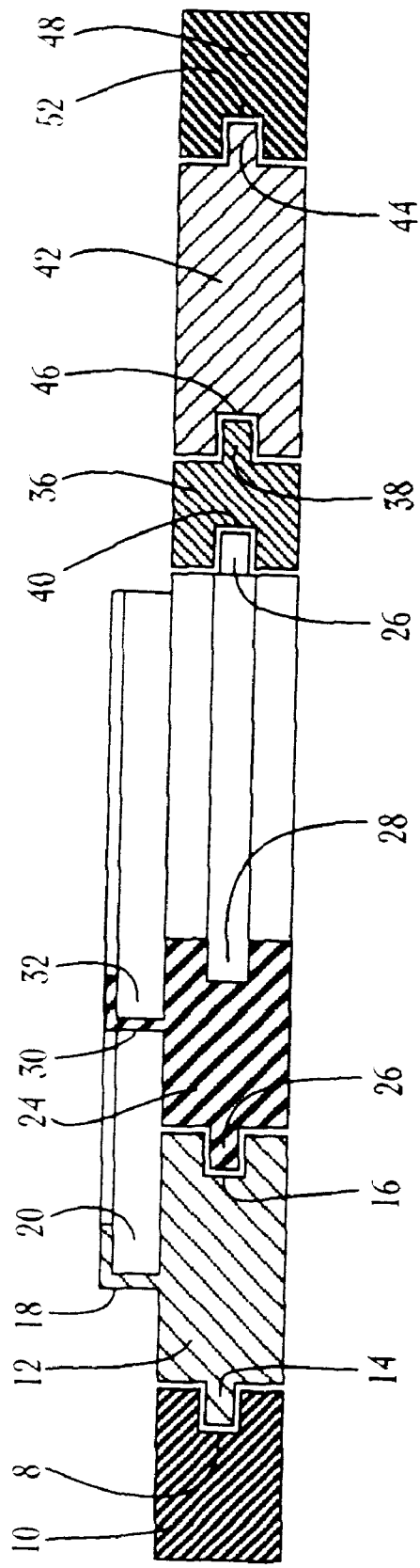
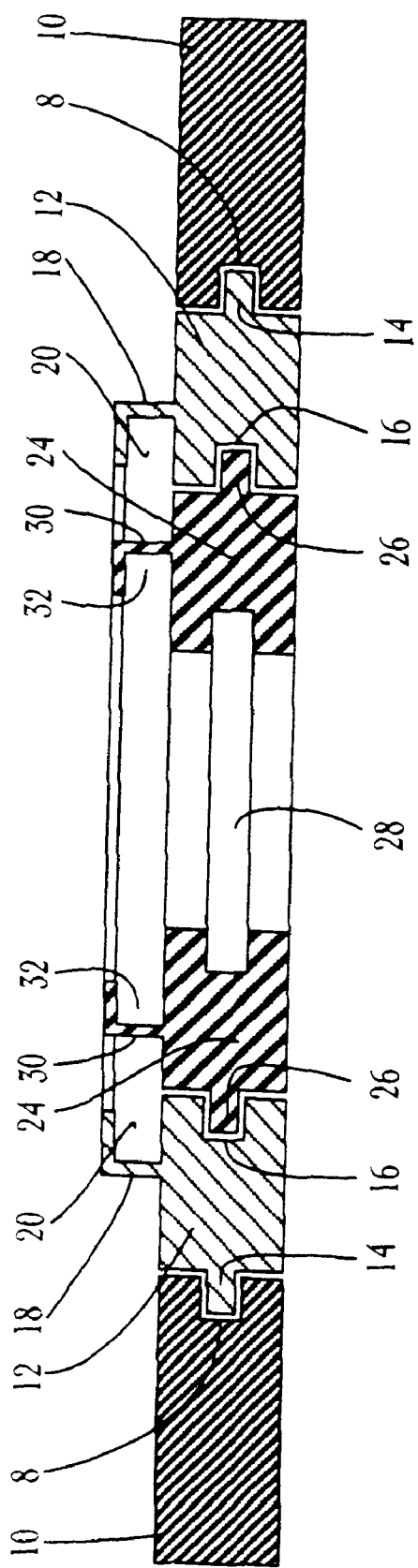

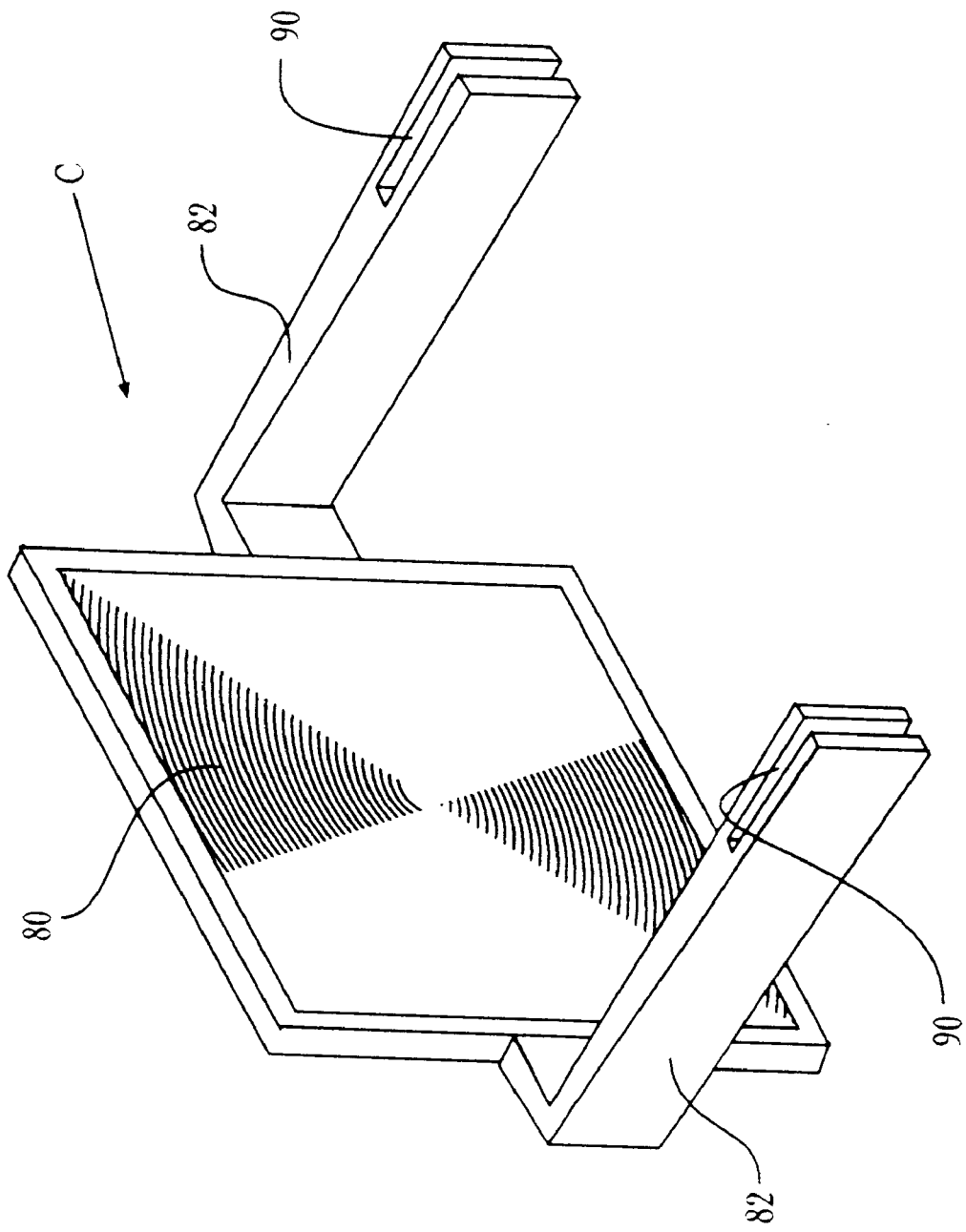
Figure 6: Magnifying Device

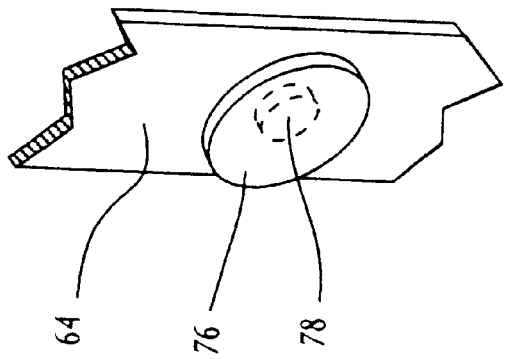
Figure 7B: Mounting Bracket Detail
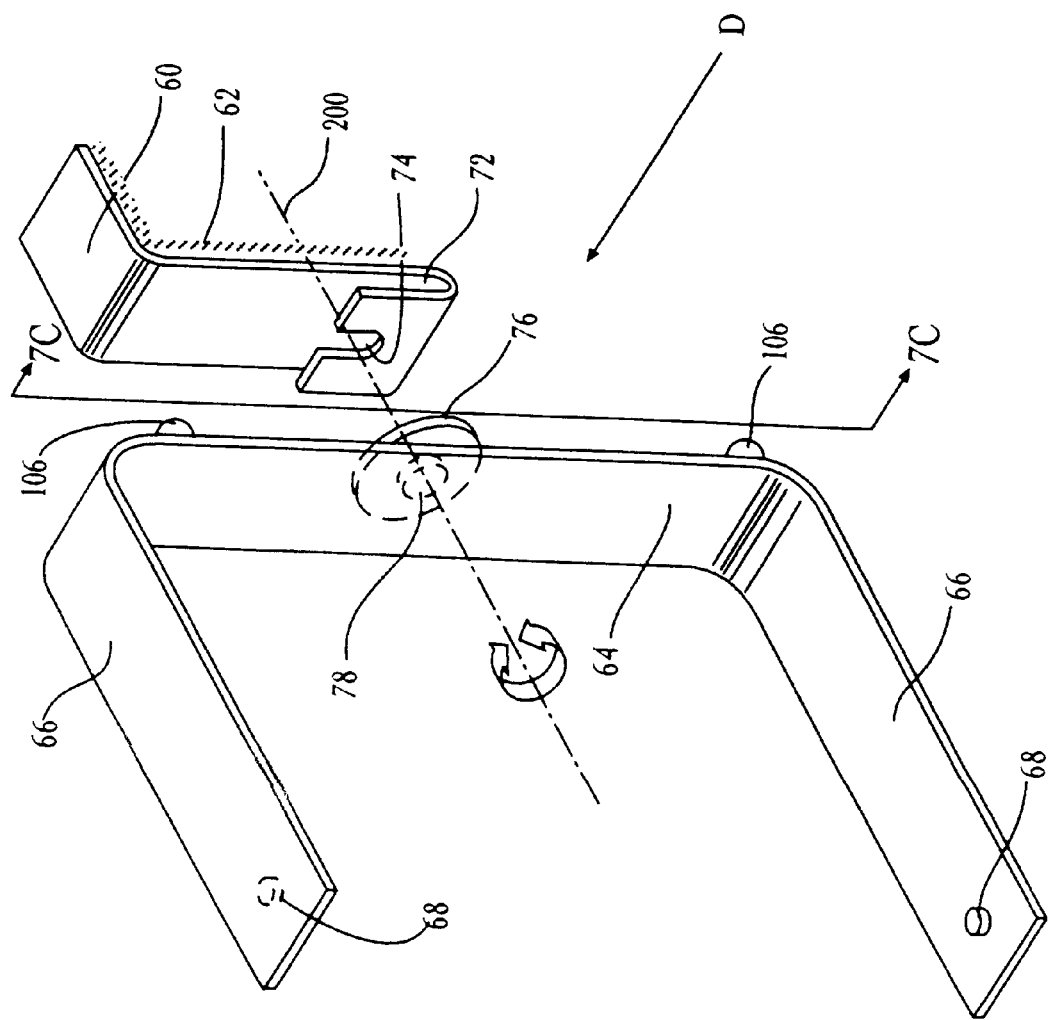
Figure 7A: Mounting Bracket

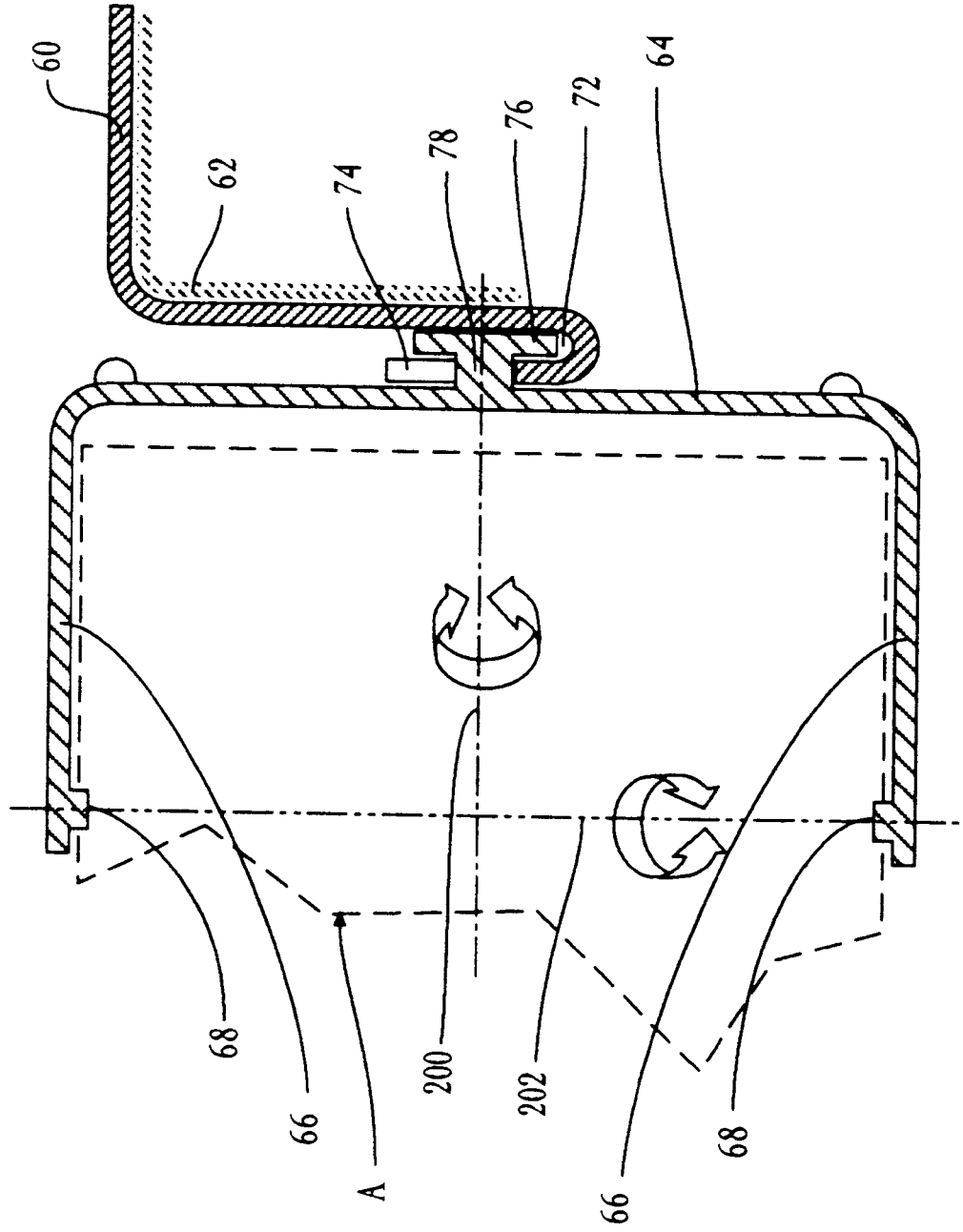
Figure 7C: Mounting Bracket Sectional Side View

LIGHT BOX APPARATUS FOR COMPUTER EDITING OF PHOTOGRAPHS

FIELD OF INVENTION

This invention relates to the graphic arts field and computer editing of photographs, specifically transparencies, slides, or film negatives.

DISCUSSION OF PRIOR ART

Historically, transparent photographic images were placed on a horizontal backlit viewing surface for the purpose of image selection. The photographic image was viewed through a magnifying lens or loupe in order to clearly see details of the image. When an image has been scanned into a computer, it must be edited, and the light box is used in the same manner to compare the photographic image to the computer image. Room light flooding onto the image obscures detail and lessens contrast, making image comparison difficult. Extraneous light emitting from the light box causes glare and produces the same effect. The horizontal orientation of the light box forces the computer operator to lean over the box to view the photo. The constant necessary comparison of the images can cause the computer operator to have back and neck strain. Previous light boxes have not addressed these problems because the process of scanning photographs and editing the resultant images is a relatively new procedure. Angled viewers still require the operator to physically move to examine the photographic image closely.

OBJECTS AND ADVANTAGES

Accordingly, several objects and advantages of my invention are to have the option to remove the light box to a vertical viewing position in order to ease back and neck strain. By virtue of a mounting bracket, the light box may be adjusted left or right, up or down to achieve the best view relative to the computer monitor. The light box may also be used in a conventional manner in a horizontal position for image selection, or placed on a horizontal surface using said bracket as a support, allowing the angle of the light box face to be changed as desired. This invention provides light shades to prevent extraneous room and outside light from obscuring the photographic image. An interlocking film matrix incorporates a photographic image into a rigid frame, serving both the purpose of containing the image relative to the light source, and eliminating all other light emitting from the light box. A further object is that the film matrix may be used to secure the film on flatbed scanners commonly used by desktop publishers. The magnification device adds the dimension of visually enlarging the photographic image clearly without having to hold a loupe or magnifying lens with the hands in order to compare details and color in the two images. Therefore, the operator can continue using his or her hands on the computer keyboard, mouse, or other cursor pointing device.

DESCRIPTION OF DRAWINGS

FIG. 1 is a perspective view of my light box attached to a computer monitor.

FIG. 1A is an exploded view of the major components of my light box as it is connected to a computer monitor.

FIG. 2 is a perspective view of my light box free-standing on a horizontal surface.

FIG. 3 is a detailed view of my light box.

FIG. 4 is an exploded view of my film matrix.

FIG. 5 is a perspective view of my assembled film matrix.

FIG. 5A is a view in detail of the film matrix assembled for a mounted 35 mm slide.

FIG. 5B is a view in detail of the film matrix assembled for a single frame of 35 mm film.

FIG. 5C is a view in detail of the film matrix assembled for a mounted 6×6 cm slide.

FIG. 5D is a view in detail of the film matrix assembled for a single frame of 6×6 cm film.

FIG. 5E is a view in detail of the film matrix assembled for a single frame of 6×7 cm film.

FIG. 5F is a view in detail of the film matrix assembled for a sheet of 9.8×12.4 cm film.

FIG. 5G is a cross sectional view through the film matrix on an X-axis, the long way through a horizontal or vertical image.

FIG. 5H is a cross sectional view through the film matrix on a Y-axis, the short way through a horizontal or vertical image.

FIG. 6 is a view in detail of a magnifying device attachment.

FIG. 7A is an exploded view of the mounting bracket used to attach the light box to a computer monitor or shelf.

FIG. 7B is a reverse-angle detail view of the mounting bracket disk.

FIG. 7C is a sectional view of the assembled mounting bracket used to attach the light box to a computer monitor or shelf.

LIST OF REFERENCE NUMERALS

| | |
|---|---|
| A | Light Box Assembly |
| B | Film Matrix Assembly |
| C | Magnifying Device Assembly |
| D | Mounting Bracket Assembly |
| 8 | 9.8 × 12.4 cm Mortise |
| 9A | Matrix Attachment Hole |
| 9B | Matrix Attachment Hole |
| 9C | Matrix Attachment Hole |
| 9D | Matrix Attachment Hole |
| 10 | Master Form |
| 11 | 9.8 × 12.4 cm Film |
| 12 | First Inner Form |
| 14 | First Inner Form Tenon |
| 16 | 6 × 7 cm Film Mortise |
| 17 | 6 × 6 cm Film |
| 18 | Mounted 6 × 6 cm Slide Holder |
| 19 | Mounted 6 × 6 cm Slide |
| 20 | Mounted 6 × 6 cm Slide Holder Channel |
| 23 | 6 × 7 cm Film |
| 24 | Second Inner Form |
| 25 | 35 mm Film |
| 26 | Second Inner Form Tenon |
| 28 | 35 mm Film Mortise |
| 30 | Mounted 35 mm Slide Holder |
| 31 | Mounted 35 mm Slide |
| 32 | Mounted 35 mm Slide Holder Channel |
| 36 | 6 × 6 cm Spacer |
| 38 | 6 × 6 cm Spacer Tenon |
| 40 | 6 × 6 cm Spacer Mortise |
| 42 | 6 × 7 cm Film Spacer |
| 44 | 6 × 7 cm Spacer Tenon |
| 46 | 6 × 7 cm Spacer Mortise |
| 48 | 9.8 × 12.4 cm Film Spacer |
| 50 | 9.8 × 12.4 cm Film Spacer Tenon |
| 52 | 9.8 × 12.4 cm Film Spacer Mortise |
| 60 | Computer Monitor Bracket |
| 62 | Hook and Loop Fastener |
| 64 | Mounting Bracket Bridge |
| 66 | Mounting Bracket Arm |

-continued

LIST OF REFERENCE NUMERALS

| | |
|---|---|
| 68 | Bracket Alignment Pins |
| 70 | Bracket Indents |
| 72 | Bracket Channel |
| 74 | Mounting Slot |
| 76 | Disk |
| 78 | Spacer-Axle |
| 80 | Magnifying Lens |
| 82 | Magnifying Lens Arm |
| 84 | Aligning slide |
| 86 | Aligning slide pin |
| 88 | Aligning slide channel |
| 90 | Lens Mounting Channel |
| 100 | Translucent Light Diffuser |
| 102A | Matrix Mounting Pin |
| 102B | Matrix Mounting Pin |
| 102C | Matrix Mounting Pin |
| 102D | Matrix Mounting Pin |
| 104T | Bracket Mounting Hole |
| 104B | Bracket Mounting Hole |
| 104L | Bracket Mounting Hole |
| 104R | Bracket Mounting Hole |
| 106 | Non-skid Pads |
| 108 | Left Shade |
| 110 | Top Shade |
| 112 | Right Shade |
| 114 | Power Switch |
| 116 | AC/DC Power Connector |
| 200 | Axis of Mounting Bracket |
| 202 | Vertical Axis of Light Box |
| 204 | Horizontal Axis of Light Box |

SUMMARY

It is an object of the present invention to provide a means to view a transparent photographic film image at the same eye level of a computer screen or monitor while eliminating ambient room light and extraneous light emitted from the light box, with the added benefit of a magnified view. A further object of the invention is that it may be temporarily mounted directly onto a computer monitor or shelf, or placed flat or at an angle on a horizontal surface such as might be used to support a laptop computer.

In order to achieve the above object, there has been provided according to the present invention, a light box, comprising a uniform light source emitted through a translucent white viewing surface with attachments for receiving and containing photographic images placed in an opaque light-blocking matrix, the surrounding walls of the light box having provisions for blocking room light, glare, and reflections; and an image-magnifying lens or device operationally attached as required by the operator.

DESCRIPTION OF INVENTION

FIG. 1 shows a perspective view of a basic version of the components of my light box attached to a computer monitor. The main parts of the invention consist of Light Box A, Film Matrix B, Magnifying Device C, and Mounting Assembly D.

FIG. 1A is an exploded perspective view of the light box components. Computer monitor bracket 60 is connected to the top and side walls of the computer monitor via adhesive-backed hook-and-loop fasteners 62. The lower end of computer monitor bracket 60 is constructed with a bracket channel 72 for the purpose of containing disk 76 on mounting bracket bridge 64 within mounting slot 74 and allowing bridge 64 to rotate in a singular plane on horizontal axis 200 parallel to the screen via axle formed by axle 78 seated in channel 72. U-shaped arms 66 of bridge 64 connect via bracket alignment pins 68 into bracket mounting hole 104T on top and 104B on bottom surface of light box A, allowing rotational movement of light box A on vertical axis 202.

Film matrix assembly B is attached or removed from A by aligning holes 9A–D on pins 102A–D. These holes and pins are equidistant and allow assembly B to be rotated in 90° increments to provide correct orientation of horizontal or landscape views and vertical or portrait views. For instance: A vertical image is properly installed when hole 9A is placed on pin 102A. This places hole 9B over pin 102B, hole 9C over pin 102C, and hole 9D over pin 102D. To view a horizontal image, film matrix assembly B is rotated counter-clockwise so that hole 9A is placed on pin 102B. This places hole 9B over pin 102C, hole 9C over pin 102D, and hole 9D over pin 102A. Clockwise rotation would result in hole 9A being placed on pin 102D. This places hole 9B over pin 102A, hole 9C over pin 102B, and hole 9D over pin 102C.

Magnifying device C is attached to light shades 108 and 112 by means of lens mounting channels 90 which are slipped onto left and right shades 108 and 112 respectively and held in place by virtue of a friction fit.

FIG. 2 shows light box A on a horizontal surface such as a desktop or shelf. Mounting bracket bridge 64 is connected at bracket alignment pin 68 on mounting bracket arm 66 into bracket mounting hole 104R. The same connection is made on the opposite side within bracket mounting hole 104L, but is not visible in this view. This arrangement forms a longitudinal rear leg to the bottom rear edge of light box assembly A, by that means comprising a stable stand providing an adjustable viewing angle of a photographic image placed into one of the multiple apertures within film matrix assembly B. Rubber or similar non-skid pads 106 are situated in the four opposing corners of the outer surface of bridge 64. Film matrix assembly B is attached or removed from light box assembly A by aligning holes 9A–D on pins 102A–D. These holes and pins are equidistant and allow assembly B to be rotated in 90° increments to provide correct orientation of horizontal or landscape views and vertical or portrait views as explained in further detail in FIG. 1A. Magnifying device C is attached to shade 108 and shade 112 by means of channels 90 which are slipped onto 108 and 112 respectively and held in place by virtue of a friction fit.

FIG. 3 is a detailed phantom view of a light box, on a horizontal surface without other support showing elements unseen in FIGS. 1 and 2. Electric power to light box A is controlled by switch 114, and AC adapter socket 116 allows the light box to be powered by house current instead of the hidden on-board dry cell batteries [not shown]. Said switch and adapter socket may be located on any convenient surface of light box assembly A. Axis 204 is on a horizontal line through bracket mounting hole 104L on the left wall of light box assembly A, and bracket mounting hole 104R located on the right wall. This axis is utilized when placing the light box on a horizontal surface as shown in FIG. 2. Rubber or similar non skid material is used as resting pads 106 mounted in extreme corners of the back and bottom of light box A. Matrix mounting pins 102A–D are located equidistantly to themselves in the corners of the light box face surrounding the translucent light diffuser 100. Axis 202 is on a vertical line through bracket mounting hole 104T on the top surface, and matching hole 104B on the bottom, comprising the vertical mounting system for attachment to the side of a computer monitor as shown clearly in FIGS. 1 and 1A. Shades 108, 110, and 112 extend forward from the main body of light box A on the left, top and right sides respectively.

FIG. 4 is an exploded view of film matrix assembly B. All component elements of B are preferably manufactured from acrylic approximately one-eighth inch in thickness. U-shaped master form 10 contains four equidistantly spaced holes 9A–D. Inner space of form 10 is surrounded with mortise 8 that serves as a channel for 9.8×12.4 cm film and a receptacle for first inner form 12. Form 12 is also U-shaped, and extending from its outer perimeter is tenon 14 that slides into mortise 8 of form 10. Inner space of the U-shape of form 12 is surrounded with mortise 16 that serves as a channel for 6 cm film and a receptacle for second inner form 24. Inverted L-shaped channel 18 serves as a receptacle for a mounted 6×6 cm slide or transparency. Form 24 is also U-shaped, the outer limit formed with tenon 26 that fits into mortise 16 on form 12. Inner space of form 24 is surrounded with mortise 28 that provides a channel for 35 mm film. Inverted L-shaped channel 30 serves as a receptacle for a mounted 35 mm slide or transparency. Spacer 36 has on two short sides and one long side tenon 38, the remaining long side contains mortise 40. Short end tenons 38 are inserted into mortise 16 and effectively lock 35 mm film in place or 6×6 cm film within inner space 22 with form 24 removed. Second spacer 42 has tenon 44 on two short sides and one long side with the remaining long side containing mortise 46 which forms the locking device for 6×7 cm film when tenons 44 on short sides are inserted into mortise 16 within form 12, with form 24 and spacer 36 removed. Second spacer 42 also forms a second part of the locking device for 35 mm film when form 24 and spacer 36 are installed. Spacer 48 has tenons 50 on short sides, and mortise 52 on one long side. With components 12, 24, 36, & 42 assembled into form 10, mortise 52 locks upon tenon 44 on spacer 42, and tenons 50 lock into mortise 8 within form 10, forming a complete square matrix. Used with only form 10, spacer 48 contains and locks into place a sheet of 9.8×12.4 cm film, commonly called 4×5 in film, with mortise 52 within spacer 48 and mortise 8 within form 10 serving as receptacles for the film edges.

FIG. 5 shows fully assembled film matrix B. Master form 10 contains within its U-shape first inner form 12, second inner form 24, spacer 36, spacer 42, and spacer 48. In this configuration, it would be ready to receive a mounted 35 mm slide within channel 36. Section lines at 5G and 5H refer to cross-sectional views shown in FIGS. 5G and 5H, respectively. Matrix attachment holes 9A–D are seen in the corners of master form 10 to provide attachment to light box assembly A and allow for horizontal or vertical image viewing.

FIG. 5A shows fully assembled film matrix B with mounted 35 mm slide 31 inserted into channel 32 caused by inverted L-shaped slide holder 30. Spacers 36 and 42 are held in place by spacer 48 by virtue of mortise and tenon joints within master form 10 described in FIG. 4. A butterfly is shown as the photographic image in FIGS. 5A–F to exemplify a film frame installed. Matrix attachment holes 9A–D are seen in the corners of master form 10 to provide attachment to light box assembly A and allow for horizontal or vertical image viewing.

FIG. 5B is fully assembled film matrix B with unmounted frame of 35 mm film 25 inserted into mortise 28 of second inner form 24 and mortise 40 of spacer 36. Spacers 36 and 42 are held in place by spacer 48 by virtue of mortise and tenon joints within master form 10 described in FIG. 4. Matrix attachment holes 9A–D are seen in the corners of master form 10 to provide attachment to light box assembly A and allow for horizontal or vertical image viewing.

FIG. 5C is film matrix B assembled without second inner form 24. A 6×6 cm slide in its mounting 19 has been placed into channel 20 caused by inverted L-shaped slide holder 18. Spacer 36 cannot be seen under slide mounting 19, but is held in place by spacer 42, and spacer 48 by virtue of mortise and tenon joints within master form 10 described in FIG. 4. Matrix attachment holes 9A–D are seen in the corners of master form 10 to provide attachment to light box assembly A and allow for horizontal or vertical image viewing.

FIG. 5D shows the same assembly as indicated in 5C, with second inner form 24 removed, and unmounted 6×6 cm film 17 inserted into mortise 16 within first inner form 12 and mortise 40 within spacer 36. Spacers 36 and 42 are held in place by spacer 48 by virtue of mortise and tenon joints within master form 10 described in FIG. 4. Matrix attachment holes 9A–D are seen in the corners of master form 10 to provide attachment to light box assembly A and allow for horizontal or vertical image viewing.

In FIG. 5E, second inner form 24 and spacer 36 have been removed, and a frame of 6×7 cm film 23 inserted into mortise 16 of first inner form 12 and mortise 46 of spacer 42. Spacer 42 is held in place by spacer 48 by virtue of mortise and tenon joints within master form 10 described in FIG. 4. Matrix attachment holes 9A–D are seen in the corners of master form 10 to provide attachment to light box assembly A and allow for horizontal or vertical image viewing.

In FIG. 5F, first inner form 12, second inner form 24, spacer 36, and spacer 42 have been removed, and a single sheet of 9.8×12.4 cm film inserted into mortise 8 within master form 10, and held in place by mortise 52 within 48 by virtue of mortise and tenon joints described in FIG. 4.

FIG. 5G is a cross-sectional view through the long dimension of the photographic apertures of film matrix assembly B. Master form 10 has within its inner boundary mortise 8. Tenon 14 extends outward from first inner form 12, and fits into mortise 8. The inner boundary of first inner form 12 contains mortise 16 into which fits tenon 26 extending from the outer limits of second inner form 24. Mounted 6×6 cm slide holder 18 is an inverted L-shape that contains or realizes mounted 6×6 cm slide holder channel 20, open at the right end. Mounted 35 mm slide holder 30 is similarly an inverted L-shape forming mounted 35 mm slide holder channel 32, also open at the right end. Mortise 28 forms a channel for unmounted 35 mm film, and extends the length of second inner form 24, terminating in tenon 26 that fits into mortise 40 of spacer 36. Tenon 38 of spacer 36 fits into mortise 46 of spacer 42, said spacer terminating in tenon 44 fitting into mortise 52 of spacer 48.

FIG. 5H is a cross-sectional view through the short dimension of the photographic apertures of film matrix assembly B, and is symetrical from left to right. Master form 10 has within its inner boundary mortise 8. Tenon 14 extends outward from first inner form 12, and fits into mortise 8. Mortise 16 within first inner form 12 receives tenon 26 extending outwardly from second inner form 24. Mortise 28 within second inner form 24 receives unmounted 35 mm film. The top surface is distinguished by inverted L-shapes 18 and 30 causing mounted 6×6 cm slide holding channel 20, and mounted 35 mm slide holding channel 32, respectively.

A rear perspective view of magnifying device C is shown in FIG. 6. In this embodiment, magnification is achieved with a Fresnel magnifying lens 80. Lens 80 has two arms 82, extending from the outer perimeter 180° to each other. Arms 82 then make 90° bends toward the rear surface of lens 80. The length of arms 82 is determined by the proper focal length of a given lens in use, allowing for various magnifications or foci. Terminal ends of arms 82 contain channels 90 of sufficient width to cause a close friction fit around shades 108 and 112, as shown in FIG. 1.

FIG. 7 is a detailed exploded view of mounting bracket assembly D, and comprises means to mount light box A to the side of a computer monitor, shelf, or other similar surface. Monitor mounting bracket 60 has affixed to its undersurface a self-adhesive hook-and-loop fastener 62. The inverted L-shape is aligned at the edge of a computer monitor, computer housing or shelf already installed with opposing self-adhesive hook-and-loop fastener, the downward-pointing leg of the L-shape curving back onto itself 180° forming channel 72. The terminus has removed a further groove 74 serving as a bearing surface for spacer-axle 78, and disk 76 located in the center of the U-shaped span of mounting bracket bridge 64. Mounting bracket arms 66 bend 90°0 to the center form of bridge 64, causing a U-shape. The inner surface of arms 66 have bracket alignment pins 68 at their terminus to provide axial connection with light box A within holes 104T and 104B as shown in FIG. 1. Pads of a non-skid material such as rubber are attached to mounting bracket bridge 64 to provide a gripping surface when the unit is free-standing on a horizontal surface with mounting bracket bridge 64 acting as an angular support such as shown in FIG. 2. A vertical line at Section 7C refers to a cutaway sectional drawing at FIG. 7C.

FIG. 7B is a reverse-angle view of disk 76 attached to spacer-axle 78 and mounting bracket bridge 64.

FIG. 7C is a cross-sectional view of mounting bracket assembly D for the purpose of better seeing the working assembly. Bracket 64 has emanating from its center span axle-spacer 78 terminating in disk 76. Disk 76 is inserted into channel 72 formed at the terminus of computer mounting bracket 60, and spacer-axle 78 rests at the bottom of groove 74, forming an axis 200 whereby bracket 64 might rotate. Bracket alignment pins 68 are inserted into holes 104T and 104B on light box A, not shown.

OPERATION OF INVENTION

In this representation, light box A consists of a box of a construction such that a light source inside the box would only emit light through a translucent light diffuser 100 on the front surface of light box A facing the operator. A light-tight box of this manner would not allow light to stray into the room causing glare to the operator or others in the room. The internal light source is preferably of a nature to provide a color temperature of 5,000° K. which is the standard used in the graphic arts industry for color comparison, and may be powered by electrical current from dry cell batteries within the box, or a remote alternating current to direct current converter plugged into alternating current adapter socket 116 in an outer wall of the box. Adequate ventilation holes are provided in the rear wall of the box in a conventional manner not shown. The optimal shape for translucent light diffuser 100 viewing area is a square, so that a rectangular film shape may be viewed correctly in a horizontal or vertical alignment by rotating film matrix B 90° as required. The embodiment shown here depicts fixed side and top wall extensions or shades 108, 110, 112, for the purpose of blocking ambient room light, glare, and reflections. This increases photographic image contrast, and projects colors as true as possible with artificial light.

Mounting bracket D consists of computer monitor bracket 60 attached via hook-and-loop fastener means to the top and side wall of a computer monitor, shelf, or other similarly shaped surface, and mounting bracket bridge 64 placed in a vertical orientation for attachment to computer monitor bracket 60 via a union at channel 72/spacer-axle 78. Bracket mounting pins 68 are inserted into bracket mounting holes 104T and 104B on the top and bottom sides of light box A, respectively. When so mounted, light box A may be rotated left and right, as well as up and down for easy viewing adjustment. Mounting bracket bridge 64 may be removed to a horizontal position by placing bracket alignment pins 68 into bracket mounting holes 104L and 104R on left and right sides, respectively, on light box A for placement on a desktop, shelf, or other horizontal surface. This arrangement allows light box A to be utilized by persons using portable or laptop computers that have viewing screens at table-top level. By adjusting the angle of bridge 64 in reference to light box A, the viewing angle of the photographic image is changed to meet the needs of the operator.

Film Matrix B is constructed of six interlocking flat pieces that connect to each other with a mortise and tenon assembly. Furthermore, mortises on various pieces provide a receptacle for different commercial sizes of photographic film. By removing or adding pieces, four different film sizes are accommodated: 35 mm, 6×6 cm, 6×7 cm, and 9.8×12.4 cm; raised channels are provided to fit mounted 35 mm and 6×6 cm film commonly referred to as slides or transparencies. The film matrix is assembled with the photographic film that is being edited in place, and installed onto the light box via holes located in a symmetrical manner to like positioned pins on the light box. The purpose of a symmetrical mounting arrangement is to allow the film matrix to be rotated to accommodate horizontal or vertical photographic images. The film matrix is opaque, letting no light pass through itself; mortise and tenon joins throughout serve the same purpose, allowing the operator to only see the photographic image without extraneous and bright light emitted from the light box viewing surface. This results in lessened eye strain, and isolates the image for greater concentration and study.

Light shades on the top, left, and right sides block the photographic image from reflections, glare and extraneous room light that affect the visibility of the photographic image. Reflections and glare obliterate photographic details from the operator's view, and extraneous room light serves to lower the visible density, color range, and contrast of the image; light shades act to reduce or eliminate the situation.

A magnification device may be temporarily attached or detached as the operator requires for an enlarged view of the photographic image. Magnification allows the operator to better see details and color in the photograph, especially in the smaller 35 mm and 6 cm film sizes; it lessens eye strain, and brings the image closer in size to the size of the scanned image seen on the computer screen. Plastic or acrylic Fresnel lens magnification is the preferred embodiment due to the necessity for light weight. It is not necessary to remove the magnification device when changing photographic images.

CONCLUSION, RAMIFICATIONS, AND SCOPE OF INVENTION

Thus the reader will see that the light box and film matrix of the invention provides a highly reliable, efficient device for the editing of transparent photographic images by computer operators, designers, service bureau technicians, artists, and photo retouchers, and hobbyists.

While my above description contains many specifications, these should not be construed as limitations on the scope of the invention, but rather as an exemplification of one preferred embodiment thereof. Many other variations are possible.

For example, the translucent viewing surface could be circular in shape instead of square, and the box shape itself could easily be curvilinear instead of the preferred square shape.

The light shades could be on hinges for placement or removal, or fitted into recessed pockets and telescoped outward for shading, or compressed into the light box body for storage. The mounting system could consist of a stand or tripod to elevate the light box to a preferred viewing level. The size illustrated relates to the most common commercial film sizes and could easily be constructed larger to accommodate 5×7 inch and 8×10 inch film sheets with larger film matrix assemblies.

The mortise and tenon interlocking construction of the film matrix could be tongue and groove, convex and concave surfaces, or male and female triangular shapes. The matrix could be fit to the light box by virtue of the pin and hole arrangement illustrated; snapped into a lower shelf and friction fixed at the top edge; or slipped into a slotted aperture in front of the translucent viewing surface. By surrounding the translucent viewing area with a strip of ferrous metal, the film matrix could consist of several pieces of magnetic sheeting with apertures suitable for the various film formats, thereby holding the film between the magnetic sheet and translucent viewing surface by virtue of magnetic force.

The magnifying device could be made of glass or plastic material, or be of Fresnel design as shown. Legs attached to the magnifying device could be on hinges such that legs could fold flat against the lens for storage, or the legs could be attached permanently to the sides of the light box and the magnifying device swung out of position when not needed, or legs could be inserted into recesses in the face of the light box. The magnification device could be mounted on a separate bracket attached to the computer monitor, or on a free-standing pedestal.

Accordingly, the scope of the invention should be determined not by the embodiment(s) illustrated, but by the appended claims and their legal equivalents.

I claim:

1. An apparatus for viewing photographic images for comparison with said images scanned or digitized into a computer for editing, comprising:

(a) a housing which is generally rectangular in cross section, said housing having a front surface containing a translucent viewing surface, said housing left, top, and right walls having means to provide light shades;

(b) a means to attach said housing immediately adjacent to a computer screen or monitor;

(c) a means to contain photographic images in mounted 35 mm, mounted 6×6 cm, and loose 35 mm, 6×6 cm, 6×7 cm, 9.8×12.4 cm film form and others, blocking extraneous light emanating from said apparatus and allowing light from said apparatus' translucent viewing surface to illuminate said photographic images only;

(d) a means to attach and detach a magnification device to said housing in order to enlarge the view of said photographic image.

2. An apparatus as in claim 1 further comprising a support for said housing when placed on a horizontal surface, with a means to adjust the angle of view.

* * * * *